United States Patent
Ochi et al.

(10) Patent No.: US 9,751,299 B2
(45) Date of Patent: Sep. 5, 2017

(54) INKJET RECORDING DEVICE AND INKJET RECORDING METHOD

(71) Applicant: MIMAKI ENGINEERING CO., LTD., Nagano (JP)

(72) Inventors: Kazuhiro Ochi, Nagano (JP); Eiichi Ohara, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/310,787

(22) PCT Filed: May 13, 2015

(86) PCT No.: PCT/JP2015/063749
§ 371 (c)(1),
(2) Date: Nov. 14, 2016

(87) PCT Pub. No.: WO2015/174448
PCT Pub. Date: Nov. 19, 2015

(65) Prior Publication Data
US 2017/0072682 A1    Mar. 16, 2017

(30) Foreign Application Priority Data
May 16, 2014    (JP) .................................. 2014-102786

(51) Int. Cl.
*B41J 2/21*    (2006.01)
*B41J 2/045*    (2006.01)
(Continued)

(52) U.S. Cl.
CPC ............. *B41J 2/04505* (2013.01); *B41J 2/01* (2013.01); *B41J 2/04586* (2013.01); *B41J 2/15* (2013.01);
(Continued)

(58) Field of Classification Search
CPC ...... B41J 2/01; B41J 2/04505; B41J 2/04586; B41J 2/12; B41J 2/145; B41J 2/15;
(Continued)

(56) References Cited

U.S. PATENT DOCUMENTS 6,247,788 B1 *    6/2001    Kamei .................. B41J 2/5056
                                                            347/14
6,439,677 B1 *    8/2002    Kanaya ................ B41J 2/17523
                                                            347/15
(Continued)

FOREIGN PATENT DOCUMENTS

JP    2004-167802    6/2004
JP    2006-334994    12/2006
JP    2011-116096    6/2011

OTHER PUBLICATIONS

"International Search Report (Form PCT/ISA/210)", mailed on Jul. 21, 2015, pp. 1-4, with English translation thereof.

*Primary Examiner* — Anh T. N. Vo
(74) *Attorney, Agent, or Firm* — Jiang Chyun Intellectual Property Office

(57) ABSTRACT

An inkjet recording device and an inkjet recording method are provided to suppress occurrence of banding in an inkjet recording technology using a plurality of heads. Control is performed on two heads in which some of nozzles of one head overlap nozzles of the other head such that at least one head does not perform ejection from nozzles included in the overlapping nozzles and positioned at ends of nozzle rows.

7 Claims, 12 Drawing Sheets

(51) Int. Cl.
*B41J 2/205* (2006.01)
*B41J 2/01* (2006.01)
*B41J 2/15* (2006.01)

(52) U.S. Cl.
CPC ........... *B41J 2/2056* (2013.01); *B41J 2/2132* (2013.01); *B41J 2/2146* (2013.01); *B41J 2202/20* (2013.01); *B41J 2202/21* (2013.01)

(58) Field of Classification Search
CPC ........ B41J 2/155; B41J 2/2056; B41J 2/2132; B41J 2/2146; B41J 2202/20; B41J 2202/21
See application file for complete search history.

(56) References Cited

U.S. PATENT DOCUMENTS

| | | | | |
|---|---|---|---|---|
| 7,350,899 B2* | 4/2008 | Kiguchi | ................... | B41J 2/145 347/12 |
| 8,382,241 B2* | 2/2013 | Saitoh | .................. | B41J 2/16526 347/16 |

* cited by examiner

INKJET RECORDING DEVICE AND INKJET RECORDING METHOD

CROSS-REFERENCE TO RELATED APPLICATION

This application is a 371 of international application of PCT application serial no. PCT/JP2015/063749, filed on May 13, 2015, which claims the priority benefit of Japan application no. JP 2014-102786, filed on May 16, 2014. The entirety of the above-mentioned patent applications is hereby incorporated by reference herein and made a part of this specification.

TECHNICAL FIELD

The present invention relates to an inkjet recording technology, and particularly, to an inkjet recording technology using a plurality of heads.

BACKGROUND ART

As an inkjet recording technology using a plurality of heads, there is a technology disclosed in Patent Literature 1.

In Patent Literature 1, there is disclosed an image forming apparatus which has a first recording head and a second recording head having a plurality of nozzles arranged in a predetermined direction and performs image forming using the first recording head and the second recording head connected such that a predetermined number of nozzles overlap in the predetermined direction. This image forming apparatus has a print controller performs control on formation of dots from the predetermined number of nozzles such that, in an overlapping area where dots are formed by the predetermined number of nozzles, in end portions of the recording heads in the predetermined direction, dot recording density and the number of consecutive dots in a direction perpendicular to the predetermined direction decrease as compared to those in the central part of the overlapping area in the predetermined direction.

CITATION LIST

Patent Literature

Patent Literature 1: JP-A-2011-116096 (published on Jun. 16, 2011)

SUMMARY

Technical Problem

However, in the technology disclosed in Patent Literature 1, printing on the overlapping area is performed by nozzles of the end portions of the recording heads in the predetermined direction. In this regard, according to the knowledge of the inventors of this application, since there is a case where the droplet amounts and landing positions of dots which are ejected from the nozzles of the end portions of the recording heads in the predetermined direction are different from the droplet amounts and landing positions of dots which are ejected from nozzles of the central portions of the recording heads in the predetermined direction, it is feared that banding may occur in the overlapping area. Particularly, in a case where calibration on the first recording head and the second recording head (adjustment of their relative positions) is insufficient, banding becomes remarkable.

The present invention was made in view of the above-described problem, and an object of the present invention is to provide a technology for suppressing occurrence of banding in an inkjet recording technology using a plurality of heads.

Solution to Problem

In order to solve the above-described problem, an inkjet recording device according to the present invention includes a plurality of heads, and a controller configured to control ink ejection of the plurality of heads, wherein, in the plurality of individual heads, a plurality of nozzle rows each consisting of a plurality of nozzles arranged in a first direction is apposed in a second direction intersecting with the first direction, and in at least two heads of the plurality of heads, the positions of some nozzles of one head in the first direction overlap those of some nozzles of the other head, and the controller controls the two heads such that (i) with respect to the overlapping nozzles, ink is ejected from the nozzles of any one head, and (ii) with respect to a set of at least one pair of nozzles consisting of nozzles of the heads included in the overlapping nozzles and disposed at the same position or at close positions in the first direction, switching to a head to eject ink according to positions in the second direction on an ink ejection object is performed, and (iii) at least one head of the two heads does not perform ejection from nozzles included in the overlapping nozzles and disposed at ends of the nozzle rows.

According to the above-described configuration, with respect to the overlapping nozzles, ink is ejected from the nozzles of any one head, and with respect to the set of at least one pair of nozzles consisting of nozzles of the heads included in the overlapping nozzles and disposed at the same position or close positions in the first direction, switching to a head to eject ink according to positions in the second direction on an ink ejection object is performed. Therefore, it is possible to blur the boundary of areas which are recorded by the two heads, respectively, and suppress banding. However, since the amount of droplets which are ejected from the nozzles disposed at the ends of the nozzle rows varies, if the vicinity of the boundary of areas which are recorded respectively by the two heads is printed by the nozzles disposed at the ends of the nozzle rows, small or large dots are recorded in the vicinity of the boundary, and it is feared that banding may occur. In contrast with this, according to the above-described configuration, at least one head performs recording on the vicinity of the boundary without using the nozzles disposed at the ends of the nozzle rows, it is possible to suppress occurrence of banding.

Also, according to the above-described configuration, in the two heads having the overlapping nozzles, combinations of nozzles included in the overlapping nozzles, disposed at the same positions or close positions in the first direction, and belonging to the set of at least one pair of nozzles are used to blur the vicinity of the boundary of areas which are recorded by the two heads, respectively. Therefore, even in a case where calibration on the two heads is insufficient, it is possible to suppress banding from becoming remarkable.

In an aspect, in the inkjet recording device according to the present invention, the two heads may have a plurality of nozzle rows for ejecting ink of the same color, and in the nozzle rows for ejecting ink of the same color, positions in the first direction of nozzles included in one nozzle row and belonging to the set of at least one pair of nozzles may be the same as or closest to those of nozzles included in the other nozzle row and belonging to the set of at least one pair of nozzles.

According to the above-described configuration, in the two heads having the overlapping nozzles, combinations of the nozzles included in the overlapping nozzles, disposed at the same positions or close positions in the first direction, and belonging to the set of at least one pair of nozzles are used to blur the vicinity of the boundary of areas which are recorded by the two heads, respectively, and in the set of at least one pair of nozzles included in the nozzle rows for ejecting ink of the same colors, the positions in the first direction of the nozzles of one nozzle row are the same as or close to those of the other nozzle row. Therefore, even in a case where calibration on the two heads is insufficient, it is possible to suitably suppress banding from becoming remarkable.

In an aspect, in the inkjet recording device according to the present invention, the controller may control the two heads such that all of areas which are recorded by the overlapping nozzles of one head of the two heads and areas which are recorded by the overlapping nozzles of the other head continue in the first direction.

According to the above-described configuration, in the two heads having the overlapping nozzles, areas which are recorded respectively by both heads continue. Therefore, it is possible to prevent any of consecutive dots in the first direction from being recorded by both heads. Therefore, even in a case where calibration on the two heads is insufficient, it is possible to suitably suppress banding from becoming remarkable.

In an aspect, in the inkjet recording device according to the present invention, the controller may be configured to control the two heads such that a width in the first direction of an area which is recorded by the nozzles belonging to the set of at least one pair of nozzles becomes equal to or less than twice a unit width in the first direction, and the unit width in the first direction may be a width in the first direction of an area which is recorded by as many nozzles neighboring each nozzle in the first direction and included in one head of the two heads as the number of the nozzle rows for ejecting ink of the same color.

According to the above-described configuration, in the two heads having the overlapping nozzles, combinations of the nozzles included in the overlapping nozzles and belonging to the set of at least one pair of nozzles are used to blur the vicinity of the boundary of areas which are recorded by the two heads, respectively, and the width in the first direction of a range which is recorded by the set of at least one pair of nozzles is reduced. Therefore, even in a case where calibration on the two heads, particularly in a main scan direction is insufficient, it is possible to suitably suppress banding from becoming remarkable.

In an aspect, in the inkjet recording device according to the present invention, the controller may control the two heads such that widths by which the individual nozzles belonging to the set of at least one pair of nozzles perform consecutive recording in the second direction are the same.

According to the above-described configuration, in the vicinity of the boundary of areas which are recorded by the two heads, respectively, since the widths by which the individual nozzles perform consecutive recording in the second direction are the same, it is possible to suppress variation between recording areas of the nozzles, and suitably suppress banding from becoming remarkable.

In an aspect, in the inkjet recording device according to the present invention, the controller may control the two heads such that both heads do not perform ejection from nozzles included in the overlapping nozzles and disposed at ends of the nozzle rows.

According to the above-described configuration, in the two heads having the overlapping nozzles, both heads record the vicinity of the boundary without using the nozzles disposed at the ends of the nozzle rows. Therefore, it is possible to suitably suppress occurrence of banding.

An inkjet recording method according to the present invention is an inkjet recording method using a plurality of heads, wherein in the plurality of individual heads, a plurality of nozzle rows each consisting of a plurality of nozzles arranged in a first direction is apposed in a second direction intersecting with the first direction, and in at least two heads of the plurality of heads, the positions of some nozzles of one head in the first direction overlap those of some nozzles of the other head, and the inkjet recording method includes a head control process of controlling the two heads such that (i) with respect to the overlapping nozzles, ink is ejected from the nozzles of any one head, and (ii) with respect to a set of at least one pair consisting of nozzles of the heads included in the overlapping nozzles and disposed at the same position or at close positions in the first direction, switching to a head to eject ink according to positions in the second direction on an ink ejection object is performed, and (iii) at least one head of the two heads does not perform ejection from nozzles included in the overlapping nozzles and disposed at ends of the nozzle rows.

According to the above-described configuration, it is possible to achieve the same effects as those of the inkjet recording device according to the present invention.

Advantageous Effects of Invention

According to the inkjet recording method and the inkjet recording device of the present invention, in an inkjet recording technology using a plurality of heads, it is possible to suppress banding from being caused in a case where calibration on heads is insufficient.

DESCRIPTION OF EMBODIMENTS

The present invention provides an inkjet recording device and an inkjet recording method. Also, in this specification, the term "recording" means a process of forming an image on a recording medium by ejecting ink onto the recording medium.

Figure 1:
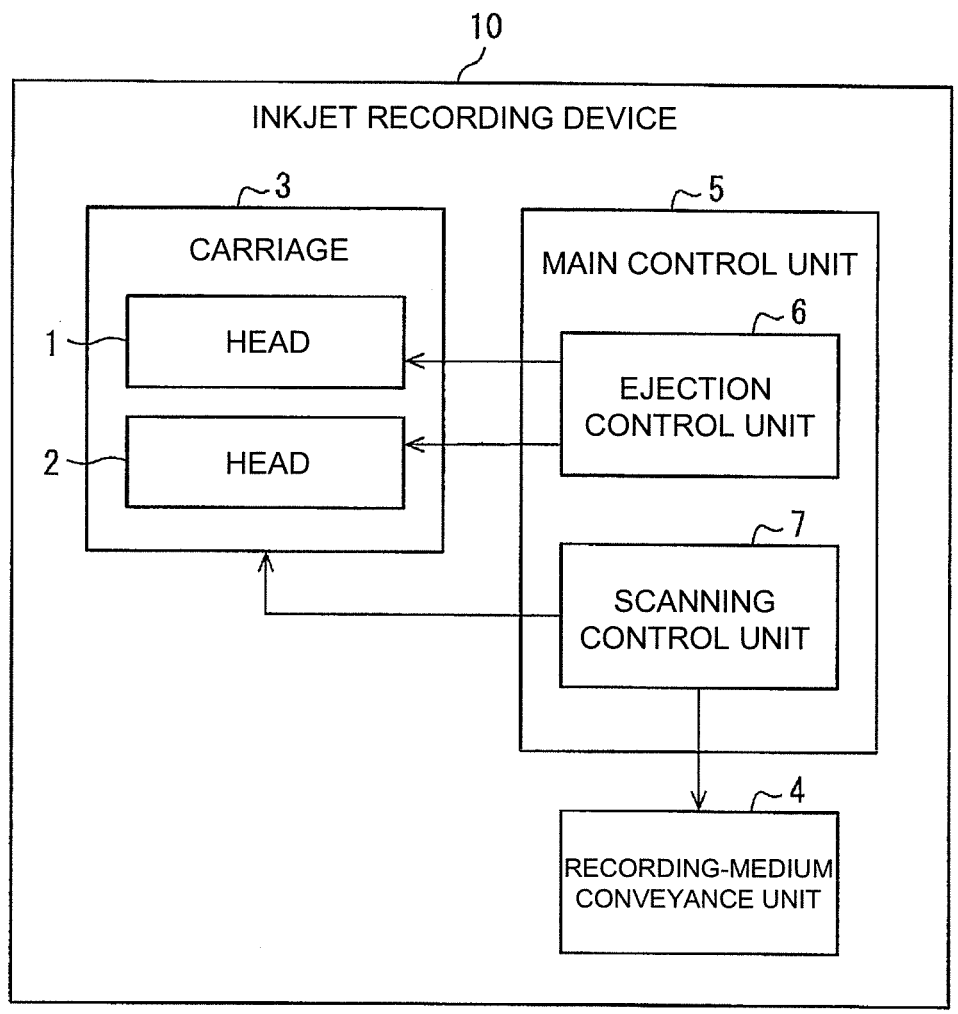
FIG. 1 is a block diagram illustrating a rough configuration of an inkjet recording device according to an embodiment of the present invention.

FIG. 1 is a block diagram illustrating a rough configuration of an inkjet recording device 10 according to an embodiment of the present invention. As shown in FIG. 1, the inkjet recording device 10 includes a head 1, a head 2, a carriage 3, a recording-medium conveyance unit 4, and a main control unit 5. The main control unit 5 includes an ejection control unit (a controller) 6 and a scanning control unit 7.

Recording media are not particularly limited as long as they are objects on which something can be recorded, and sheet materials such as paper, fabric, resin sheets, and metal sheets can be used. Also, ink for recording is not particularly limited; however, it is required to appropriately select ink according to the materials of recording media, images to be formed on recording media, and so on.

The head 1 and the head 2 each have a plurality of well-known inkjet nozzles, and ink ejection timings of the individual nozzles are controlled by the ejection control unit 6.

Also, the head 1 and the head 2 are mounted on the carriage 3, and are driven in a main scan direction by the carriage 3. In this way, it is possible to relatively move the head 1 and the head 2 in the main scan direction with respect to a recording medium. Also, the recording-medium conveyance unit 4 is for conveying a recording medium in a sub scan direction intersecting with the main scan direction, and can be configured, for example, by well-known conveying rollers and so on. By this, it is possible to relatively move the head 1 and the head 2 in the sub scan direction with respect to a recording medium. The carriage 3 and the recording-medium conveyance unit 4 are controlled by the scanning control unit 7.

(Head Arrangement)

Figure 2:
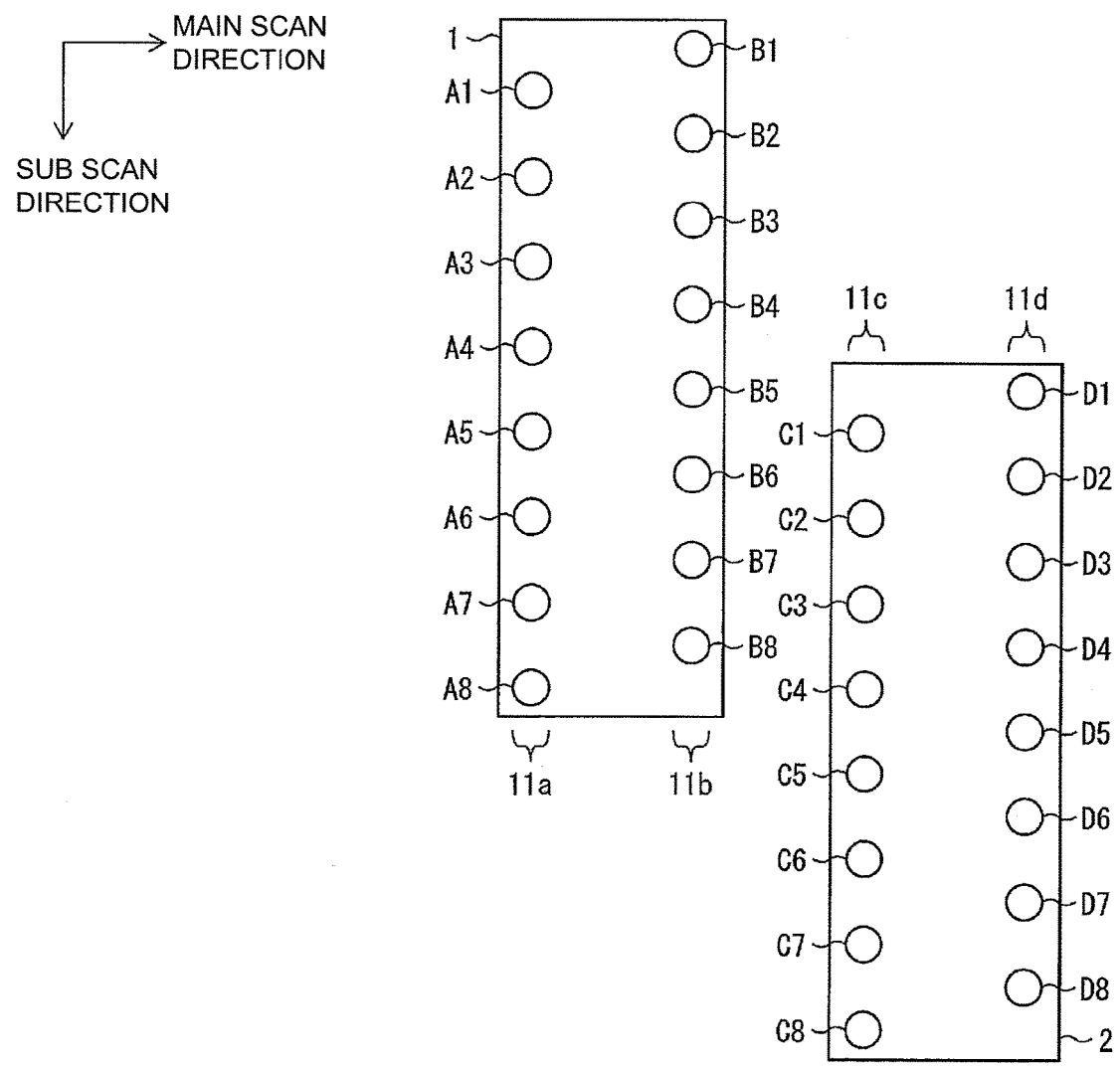
FIG. 2 is a view schematically illustrating an example of a head arrangement of the embodiment of the present invention.

The head arrangement of the inkjet recording device 10 is not particularly limited, and the inkjet recording device 10 may have a plurality of heads and have an arrangement wherein, in the plurality of individual heads, a plurality of nozzle rows each consisting of a plurality of nozzles arranged in a first direction is apposed in a second direction intersecting with the first direction, and in at least one pair of heads of the plurality of heads, the positions in the first direction of some of the nozzles of one of them overlap those of some of the nozzles of the other, and an arrangement as shown in FIG. 2 may be used as an example.

In other words, as shown in FIG. 2, in the inkjet recording device 10, the head 1 and the head 2 are staggered (a staggered layout), and the head 1 has a nozzle row 11a consisting of nozzles A1 to A8 arranged in the sub scan direction, and a nozzle row 11b consisting of nozzles B1 to B8 arranged in the sub scan direction, and the head 2 has a nozzle row 11c consisting of nozzles C1 to C8 arranged in the sub scan direction, and a nozzle row 11d consisting of nozzles D1 to D8 arranged in the sub scan direction. The positions in the sub san direction of the nozzles A5 to A8 and B5 to B8 of the head 1 overlap those of the nozzles C1 to C4 and D1 to D4 of the head 2. In other words, the head 1 and the head 2 are disposed such that, if the nozzles A5 to A8 and B5 to B8 of the head 1 are translated in the main scan direction, they can be superimposed on the nozzles C1 to C4 and D1 to D4 of the head 2.

Also, the nozzles A1 to A8, B1 to B8, C1 to C8, and D1 to D8 are configured to be able to eject ink of the same colors, respectively. In other words, the nozzle rows 11a to 11d are configured to eject ink of the same colors.

However, the numbers and arrangements of heads, nozzle rows, and nozzles shown in FIG. 2 are just illustrative, and the number of heads which the inkjet recording device 10 has is not particularly limited as long as it is two or more. Also, the relative arrangement of heads (particularly, the number of nozzles which overlap between the heads) is not particularly limited as long as at least one pair of heads of all heads are arranged such that the positions in the sub scan direction of some of the nozzles of one of them overlap those of some of the nozzles of the other. Further, the number of nozzle rows which each head has needs only to be at least the same as the number of colors of ink, and the number of nozzles which each nozzle row has is not particularly limited as long as it is larger than the number of overlapping nozzles of each nozzle row. Also, in a case of ejecting ink of the same color from a plurality of nozzle rows, the number of nozzle rows for ejecting ink of each same color is not particularly limited as long as it is two or more. Also, the heads each may further have nozzle rows for ejecting ink of different colors other than ink of the same colors.

For the sake of convenience, in the present embodiment, a description is made on the assumption that the heads 1 and 2 each have only two nozzle rows; however, the heads 1 and 2 each have one nozzle row, or three or more nozzle rows. Also, the present invention is not limited to a case where both end nozzle rows in the sub scan direction eject ink of the same colors, and it is possible to eject ink of the same colors at arbitrary positions of nozzle rows in the sub scan direction.

(Operation Examples)

Figure 11:
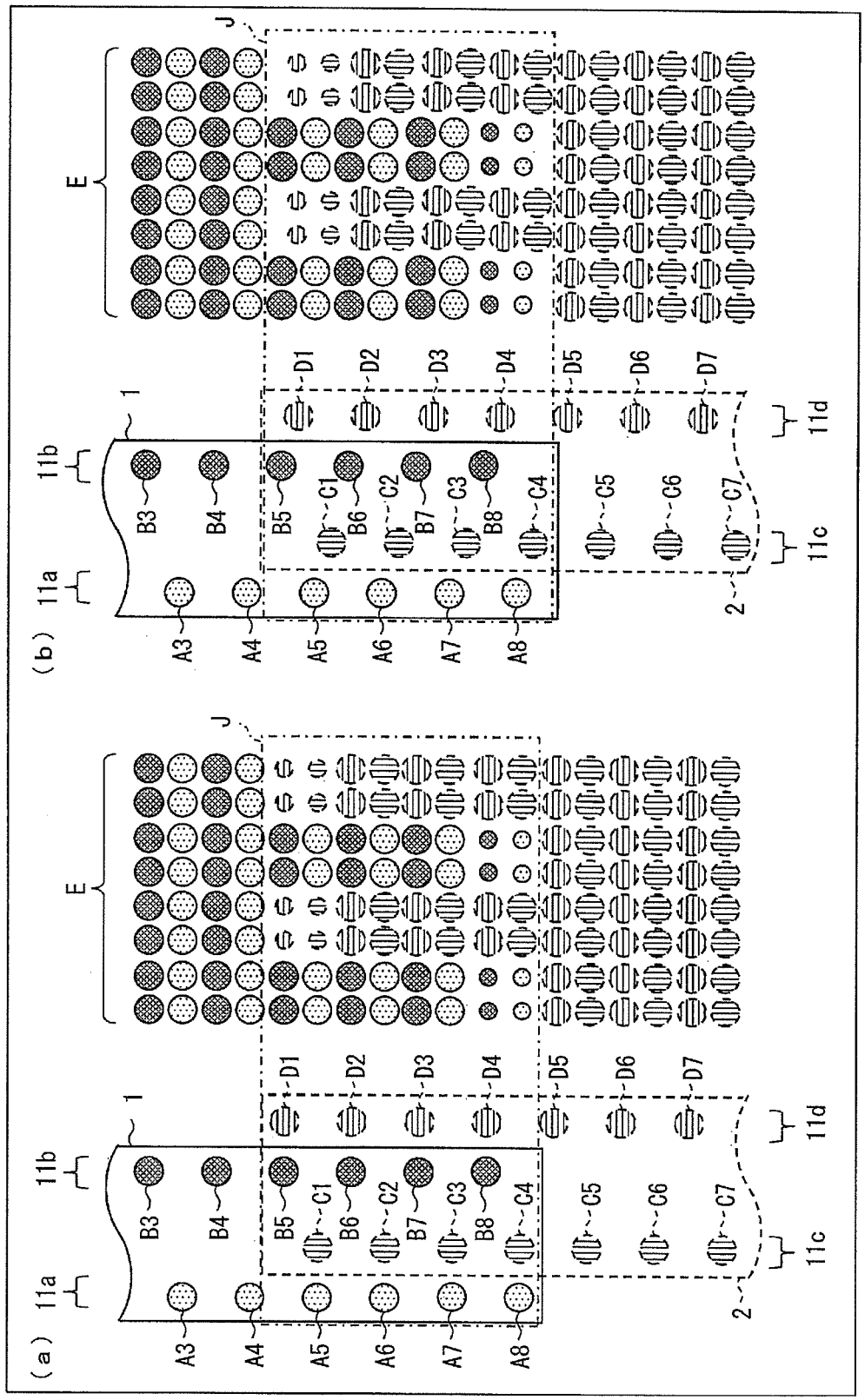
FIG. 11 is a view for explaining an operation example (a first reference example) of an inkjet recording device according to a reference example.
Figure 12:
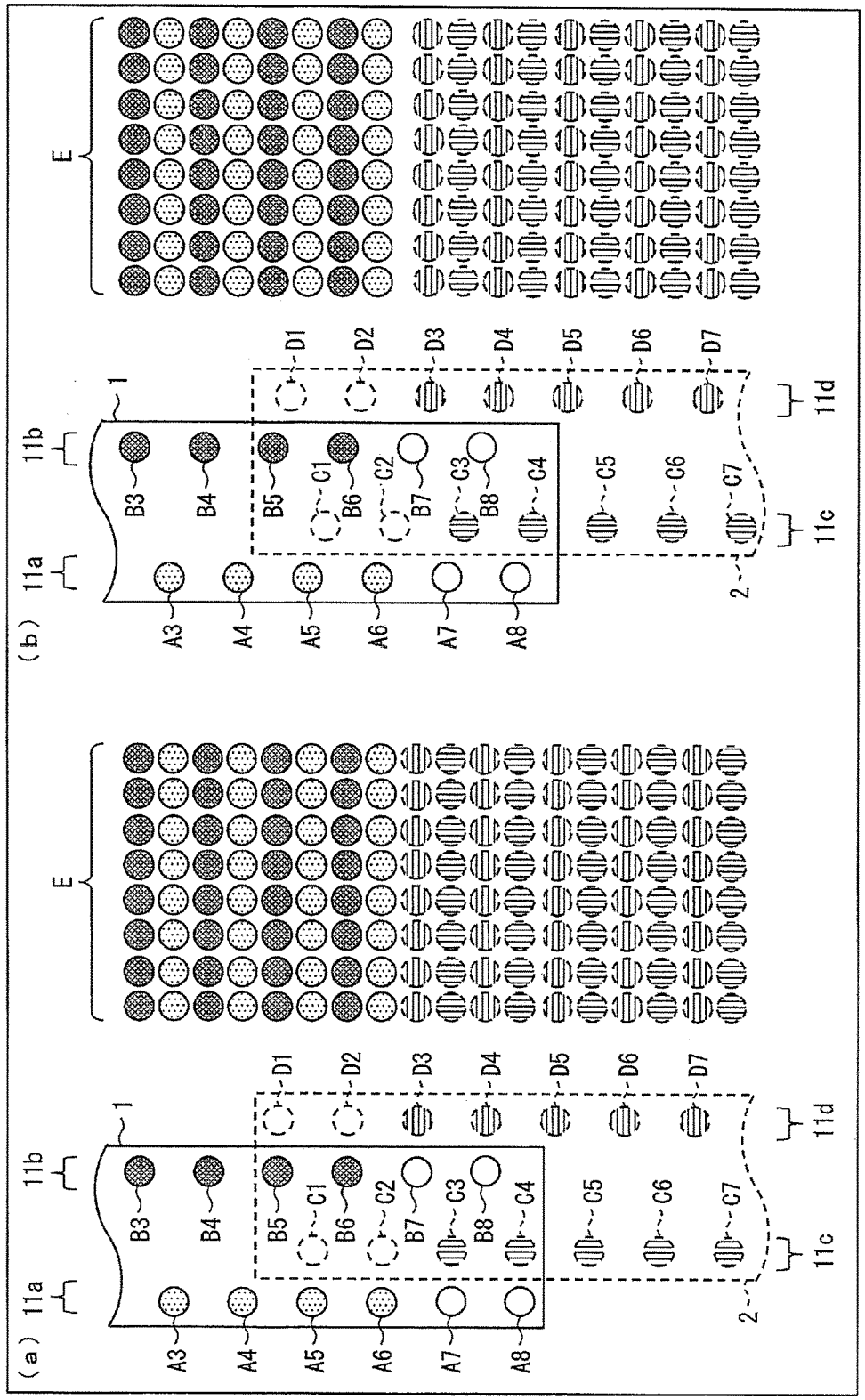
FIG. 12 is a view for explaining an operation example (a second reference example) according to an inkjet recording device according to a reference example.

Now, some operation examples of the inkjet recording device 10 according to the present embodiment, and reference examples will be described. FIGS. 3 to 10 are views for explaining first to eighth operation examples of the inkjet recording device 10, respectively, and FIG. 11 is a view for explaining an operation of an inkjet recording device according to a first reference example, and FIG. 12 is a view for explaining an operation of an inkjet recording device according to a second reference example.

In FIGS. 3 to 12, a direction from the left to the right on each drawing sheet is the main scan direction, and a direction from the top to the bottom on each drawing sheet is the sub scan direction.

In each of FIGS. 3 to 12, (a) shows a case where calibration (adjustment on the relative positions) on the heads 1 and 2 is sufficient, and (b) shows a case where calibration (adjustment on the relative positions) on the heads 1 and 2 in the sub scan direction is insufficient. Specifically, in each example shown in (a), the positions of the nozzles A5 to A8 of the head 1 (in the sixth operation example shown in FIG. 8, the nozzles A4 to A8) in the sub scan direction are the same as those of the nozzles C1 to C4 of the head 2 (in the sixth operation example shown in FIG. 8, the nozzles C1 to C5), respectively; whereas, in each example shown in (b), the positions of the nozzles A5 to A8 of the head 1 (in the sixth operation example shown in FIG. 8, the nozzles A4 to A8) in the sub scan direction are deviated from (close to) those of the nozzles C1 to C4 of the head 2 (in the sixth operation example shown in FIG. 8, the nozzles C1 to C5), respectively. Similarly, in each example shown in (a), the positions of the nozzles B5 to B8 of the head 1 (in the sixth operation example shown in FIG. 8, the nozzles B4 to B8) in the sub scan direction are the same as those of the nozzles D1 to D4 of the head 2 (in the sixth operation example shown in FIG. 8, the nozzles D1 to D5), respectively; whereas, in each example shown in (b), the positions of the nozzles B5 to B8 of the head 1 (in the sixth operation example shown in FIG. 8, the nozzles B4 to B8) in the sub scan direction are deviated from (close to) those of the nozzles D1 to D4 of the head 2 (in the sixth operation example shown in FIG. 8, the nozzles D1 to D5), respectively.

In (a) and (b) of each of FIGS. 3 to 12, on the left side of each drawing, the heads 1 and 2 are shown, and on the right side of each drawing, dots E which are recorded by the heads 1 and 2 are shown. The individual dots E have the same patterns as those of nozzles which record the individual dots E. In other words, (a) and (b) of each of FIGS. 3 to 12 show that the individual nozzles shown on the left side in each drawings record the dots E shown on the right side of each drawing, located at the same positions as those of the nozzles in the sub scan direction, and having the same patterns as those of the nozzles. Also, white nozzles shown on the left side of each drawing represent nozzles which do not eject ink.

In the first to eighth operation examples, the ejection control unit 6 performs control on the heads 1 and 2 such that (i) with respect to the overlapping nozzles, ink is ejected from the nozzles of any one head, and (ii) with respect to set of at least one pair of nozzles consisting of nozzles of the heads which are included in the overlapping nozzles and in which their positions in the sub scan direction are the same as or close to each other, switching to a head to eject ink according to positions in the main scan direction on an ink ejection object is performed. Specifically, in the first operation example shown in FIG. 3, the second operation example shown in FIG. 4, the third operation example shown in FIG. 5, the fourth operation example shown in FIG. 6, and the seventh operation example shown in FIG. 9, the nozzles A7 and C3 and the nozzles B7 and D3 correspond to the set of at least one pair of nozzles. In the fifth operation example shown in FIG. 7, the nozzles A7 and C3 and the nozzles B6 and D2 correspond to the set of at least one pair of nozzles. In the sixth operation example shown in FIG. 8, the nozzles A5 and C2, the nozzles A6 and C3, the nozzles A7 and C4, the nozzles B5 and D2, the nozzles B6 and D3, and the nozzles B7 and D4 correspond to the set of at least one pair of nozzles. Also, in the eighth operation example shown in FIG. 10, the nozzles A8 and C4 and the nozzles B8 and D4 correspond to the set of at least one pair of nozzles. According to this configuration, it is possible to blur the boundary of areas which are recorded by the heads 1 and 2, respectively, and suppress banding.

Particularly, in the first to eighth operation examples, in the heads 1 and 2, the positions in the sub scan direction of the nozzles included in one head and belonging to the set of at least one pair of nozzles are the same as or close to those of the nozzles included in the other head and belonging to the set of at least one pair of nozzles. Specifically, in the first operation example shown in FIG. 3, the second operation example shown in FIG. 4, the third operation example shown in FIG. 5, the fourth operation example shown in FIG. 6, and the seventh operation example shown in FIG. 9, the position of the nozzle A7 in the sub scan direction is the same as or close to that of the nozzle C3, and the position of the nozzle B7 in the sub scan direction is the same as or close to that of the nozzle D3. Also, in the fifth operation example shown in FIG. 7, the position of the nozzle A7 in the sub scan direction is the same as or close to that of the nozzle C3, and the position of the nozzle B6 in the sub scan direction is the same as or close to that of the nozzle D2. Also, in the sixth operation example shown in FIG. 8, the positions of the nozzles A5 to A7 in the sub scan direction are the same as or close to those of the nozzles C2 to C4, respectively, and the positions of the nozzles B5 to B7 in the sub scan direction are the same as or close to those of the nozzles D2 to D4, respectively. Also, in the eighth operation example shown in FIG. 10, the position of the nozzle A8 in the sub scan direction is the same as or close to that of the nozzle C4, and the position of the nozzle B8 in the sub scan direction is the same as or close to that of the nozzle D4. According to this configuration, even in the case where calibration on the heads 1 and 2 is insufficient, it is possible to suppress banding from becoming remarkable.

Meanwhile, in the second reference example shown in FIG. 12, with respect to the nozzles which are included in the overlapping nozzles and belongs to the set of at least one pair of nozzles, switching to a head to eject ink according to positions in the sub scan direction on an ink ejection object is not performed. Therefore, as shown in (b) of FIG. 12, in a case where calibration on the heads 1 and 2 in the sub scan direction is insufficient, remarkable banding which appears in a straight line shape in the main scan direction occurs.

Also, in the first to eighth operation examples, the ejection control unit 6 performs control such that at least one head of the heads 1 and 2 does not perform ejection from the nozzles A8 and B8 or the nozzles C1 and D1, among the overlapped nozzles, disposed at ends of the nozzle rows 11a and 11b or the nozzle rows 11c and 11d. The amount of droplets which are ejected from the nozzles A8, B8, C1, and D1 disposed at the ends of the nozzle rows 11a to 11d is not stable as compared to the other nozzles, and the droplet amount often decreases, and occurrence of deviation of landing positions is also remarkable. For this reason, if the vicinity of the boundary of areas which are recorded respectively by the heads 1 and 2 is printed by the nozzles A8, B8, C1, and D1 disposed at the ends of the nozzle rows 11a to 11d, small dots are recorded in the vicinity of the boundary, and the positions of dots often overlaps other dots due to deviation of their landing positions, and it is feared that banding may occur. In contrast with this, in the first to eighth operation examples, since the vicinity of the boundary is recorded without using the nozzles A8 and B8 or the nozzles C1 and D1 disposed at the ends of the nozzle rows 11a and 11b or the nozzle rows 11c and 11d included in at least one head, it is possible to suppress occurrence of banding attributable to the above-described phenomenon. Particularly, in the first to seventh operation examples, the ejection control unit 6 controls the heads 1 and 2 such that any one head does not perform ejection from the nozzles included in the overlapping nozzles and disposed at the ends of the nozzle rows 11a and 11b or the nozzle rows 11c and 11d of both heads, and any one head records the vicinity of the boundary without using the nozzles A8 and B8 or the nozzles C1 and D1 disposed at the ends of the nozzle rows 11a and 11b or the nozzle rows 11c and 11d. Therefore, it is possible to suitably suppress occurrence of banding.

Meanwhile, in the first reference example shown in FIG. 11, since the vicinity of the boundary of areas which are recorded respectively by the heads 1 and 2 is printed by the nozzles A8, B8, C1, and D1 disposed at the ends of the nozzle rows 11a to 11d, as shown in (a) and (b) of FIG. 11, small dots are recorded in the vicinity of the boundary, and it is feared that banding may occur.

Also, in the first to fourth and sixth to eighth operation examples, in the nozzle rows 11a to 11d, the positions in the sub scan direction of the nozzles included in one nozzle row and belonging to the set of at least one pair of nozzles are the same as or closest to those of the nozzles included in the other nozzle row and belonging to the set of at least one pair of nozzles. Specifically, in the first operation example shown in FIG. 3, the second operation example shown in FIG. 4, the third operation example shown in FIG. 5, the fourth operation example shown in FIG. 6, and the seventh operation example shown in FIG. 9, the positions in the sub scan direction of the nozzle A7 of the nozzle row 11a and the nozzle B7 of the nozzle row 11b are the same as or close to those of the nozzle C3 of the nozzle row 11c and the nozzle D3 of the nozzle row 11d, respectively. Also, in the sixth operation example shown in FIG. 8, the positions in the sub scan direction of the nozzles A5 to A7 of the nozzle row 11a, the nozzles B5 to B7 of the nozzle row 11b are the same as or close to those of the nozzles C2 to C4 of the nozzle row 11c and the nozzles D2 to D4 of the nozzle row 11d, respectively. Also, in the eighth operation example shown in FIG. 10, the positions in the sub scan direction of the nozzle A8 of the nozzle row 11a and the nozzle B8 of the nozzle row 11b are the same as or close to those of the nozzle C4 of the nozzle row 11c and the nozzle D4 of the nozzle row 11d, respectively.

According to this configuration, even in a case where calibration on the heads 1 and 2 is insufficient, it is possible to suitably suppress banding from becoming remarkable. In other words, in a case where the nozzles of the individual nozzle rows belonging to the set of at least one pair of nozzles are at different positions in the sub scan direction, if calibration on the heads 1 and 2 is insufficient, the positions of the nozzles belonging to the set of at least one pair of nozzles are relatively deviated, and differences in dot intervals occur at the boundaries of an overlapping portion J (an area which is recorded by the nozzles belonging to the set of at least one pair of nozzles) and non-overlapping portions (areas which neighbor the overlapping area J and are recorded by the nozzles which do not belong to the set of at least one pair of nozzles), and in the area interposed between the boundaries, irregularity in brightness occurs. Therefore, it is preferable that the positions in the sub scan direction of the nozzles of one nozzle row belonging to the set of at least one pair of nozzles be close to those of the nozzles of the other nozzle row belonging to the set of at least one pair of nozzles such that the area interposed between the boundaries becomes narrow.

For example, the first operation example and the fifth operation example are compared. In the first operation example, in one nozzle row in the nozzle rows 11a to 11d, the positions in the sub scan direction of the nozzles included and belonging to the set of at least one pair of nozzles are the same as or closest to that of the nozzle included in the other nozzle row and belonging to the set of at least one pair of nozzles. Meanwhile, in the fifth operation example, in the nozzle rows 11a to 11d, the positions in the sub scan direction of the nozzles included in one nozzle row and belonging to the set of at least one pair of nozzles are not the same as or closest to those of the nozzles included in the other nozzle row and belonging to the set of at least one pair of nozzles. In other words, in the fifth operation example, the nozzles of the nozzle rows 11b and 11d having positions which are the same as or closest to those of the nozzles included in the nozzle rows 11a and 11c and belonging to the set of at least one pair of nozzles are the nozzles B7 and D3 and the nozzles B8 and D4; however, as the nozzles of the nozzle rows 11b and 11d belonging to the set of at least one pair of nozzles, the nozzles B6 and D2 are selected. Like this, the first operation example and the fifth operation example are different in the positions in the sub scan direction of the nozzles included in the nozzle rows for ejecting the same colors and belonging to the set of at least one pair of nozzles. Although the first operation example and the fifth operation example are the same in the other conditions, according to the first operation example, it is possible to further suppress banding as compared to the fifth operation example.

Also, like in the first to fourth, seventh, and eighth operation examples, it is preferable that the width F in the sub scan direction of the overlapping area J which is recorded by the nozzles belonging to the set of at least one pair of nozzles be equal to or less than twice a unit width G in the sub scan direction of an area which is included in the non-overlapping portions and is recorded by two nozzles neighboring each other in the sub scan direction, and it is more preferable that the width F be equal to or less than 1.5 times the unit width G.

According to this configuration, it is possible to further suppress banding. In other words, if the width F of the overlapping portion J in the sub scan direction is decreased, since areas where irregularity in brightness occurs in the sub scan direction in a case where differences in dot intervals in the main scan direction are caused by a calibration error in the main scan direction are limited, in a case where the same color area is wide particularly in image recording or the like, it is possible to effectively suppress visible banding.

For example, the first operation example and the sixth operation example are compared. In the first operation example, the width F of the overlapping portion J in the sub scan direction becomes a distance obtained by adding a value corresponding to an error in calibration on the heads 1 and 2 in the sub scan direction to the unit width G in the sub scan direction of an area which is included in the non-overlapping portions and is recorded by two nozzles neighboring each other in the sub scan direction. Meanwhile, in the sixth operation example, the width F of the overlapping portion J in the sub scan direction becomes a distance obtained by adding a value corresponding to an error in calibration on the heads 1 and 2 in the sub scan direction to three times the unit width G in the sub scan direction of an area which is included in the non-overlapping portions and is recorded by two nozzles neighboring each other in the sub scan direction. In short, the first operation example and the sixth operation example are different in the width F of the overlapping portion J in the sub scan direction by a difference in the number of nozzles arranged in the sub scan direction and belonging to the set of at least one pair of nozzles, that is, twice the unit width G Although the first operation example and the sixth operation example are the same in the other conditions, according to the first operation example, it is possible to further suppress banding as compared to the sixth operation example. In other words, if the width F of the overlapping portion J in the sub scan direction is decreased, since areas where irregularity in brightness occurs in the sub scan direction in a case where differences in dot intervals in the main scan direction are caused by a calibration error in the main scan direction are limited, in a case where the same color area is wide particularly in image recording or the like, it is possible to effectively suppress visible banding.

Also, if the overlapping portion J is decreased, naturally, the number of nozzles which are arranged in the sub scan direction and belong to the set of at least one pair of nozzles also decreases, and it becomes possible to reduce the overlapping arrangement areas of the heads 1 and 2 staggered. Therefore, it is possible to suppress banding without decreasing the efficiency of a recording operation in the sub scan direction.

Also, the unit width G depends on the number of nozzle rows for ejecting ink of the same color. In the present embodiment, since the number of nozzle rows for ejecting ink of the same color is two, the unit width G becomes a width corresponding to two dots; however, in a case where the number of nozzle rows for ejecting ink of the same color is three, the unit width G becomes a width corresponding to three dots. In this case, on the heads, the positions in the sub scan direction of the nozzles of one of the nozzle rows for ejecting ink of the same color are different from those of the other. In other words, the unit width G in the sub scan direction is a width which is determined by the number of dots corresponding to the number of nozzle rows for ejecting ink of the same color. Specifically, the unit width means the width in the sub scan direction of an area which is recorded by as many nozzles neighboring each other in the sub scan direction and included in one head of the heads 1 and 2 as the number of nozzle rows for ejecting ink of the same color.

Also, in the first, fourth, sixth, and seventh operation examples, the ejection control unit 6 performs control such that all of areas which are recorded by the overlapping nozzles of the head 1 and areas which are recorded by the overlapping nozzles of the head 2 continue in the sub scan direction. Therefore, it is possible to prevent any of consecutive dots in the sub scan direction from being recorded by both of the heads. Therefore, even in a case where calibration on the heads 1 and 2 is insufficient, it is possible to suitably suppress banding from becoming remarkable.

Figure 4:
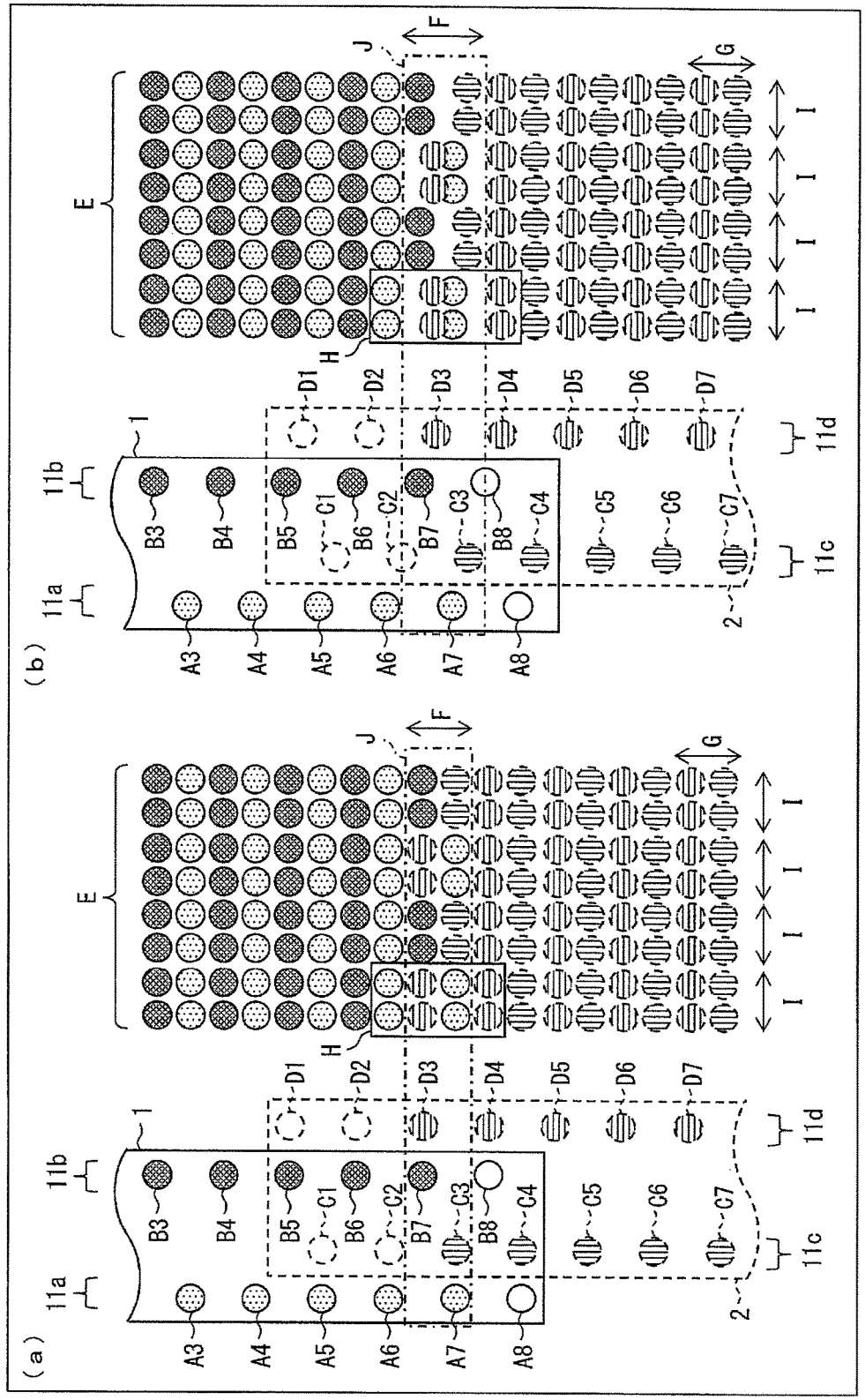
FIG. 4 is a view for explaining an operation example (a second operation example) of the inkjet recording device according to the embodiment of the present invention.
Figure 5:
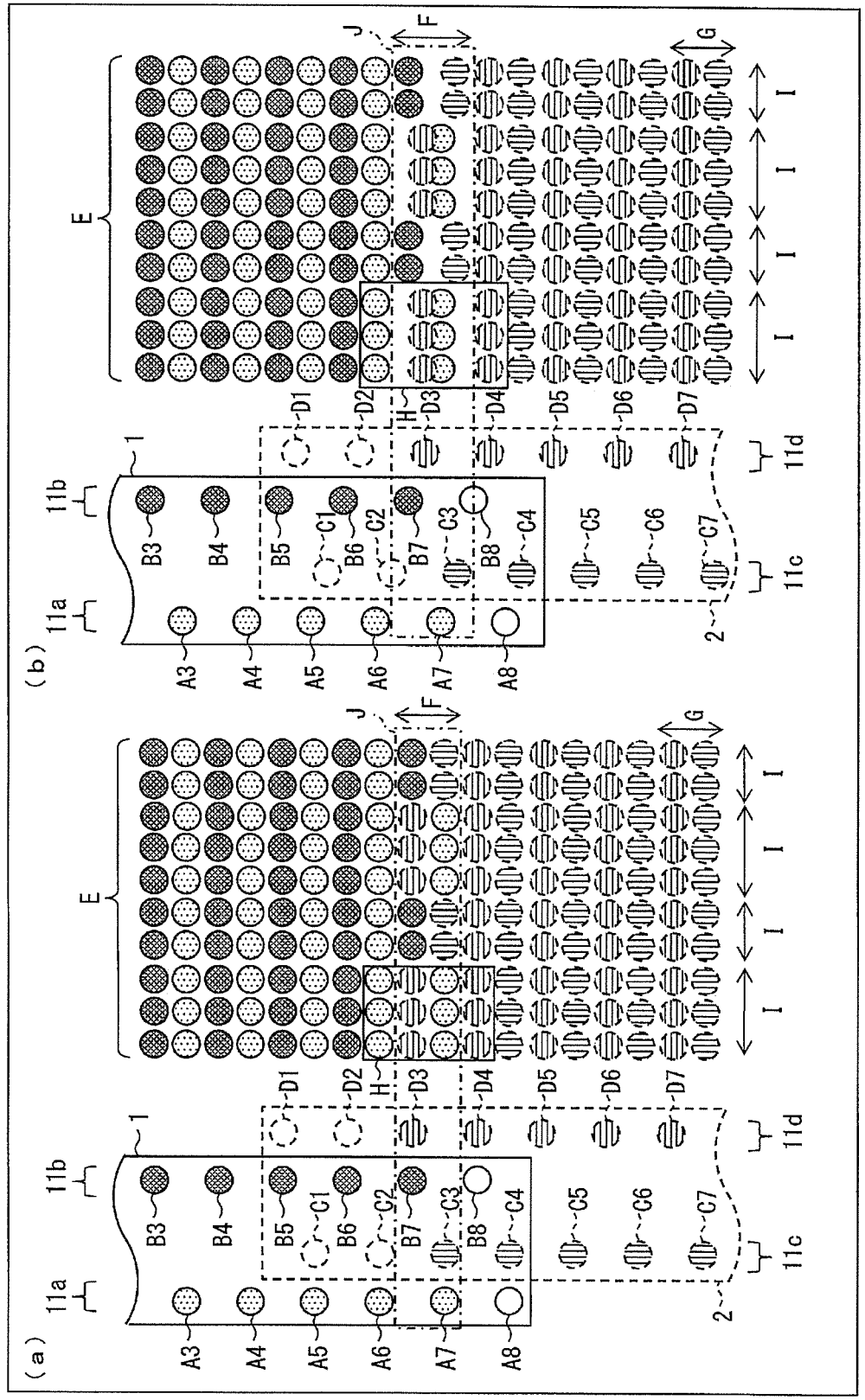
FIG. 5 is a view for explaining an operation example (a third operation example) of the inkjet recording device according to the embodiment of the present invention.
Figure 6:
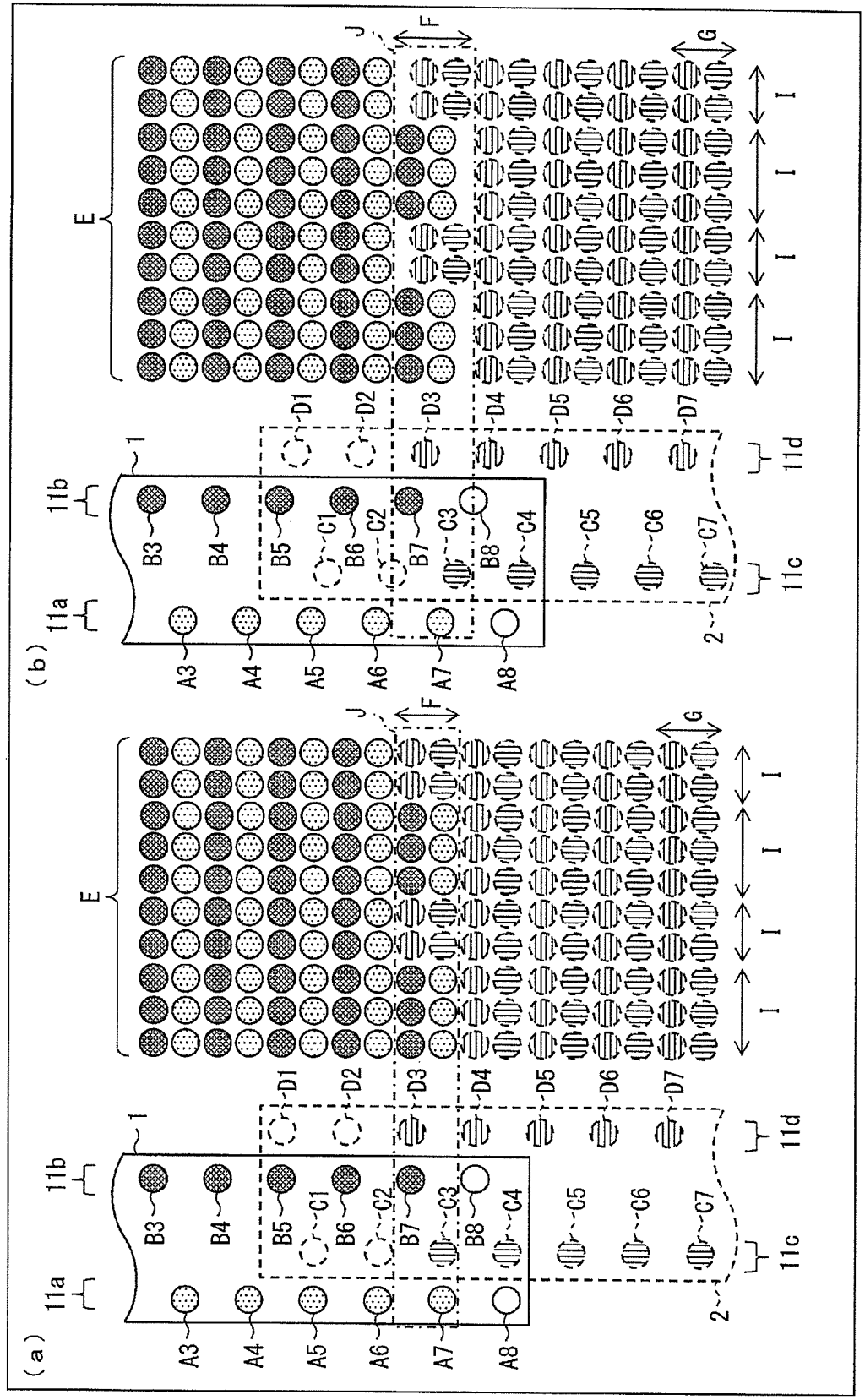
FIG. 6 is a view for explaining an operation example (a fourth operation example) of the inkjet recording device according to the embodiment of the present invention.
Figure 7:
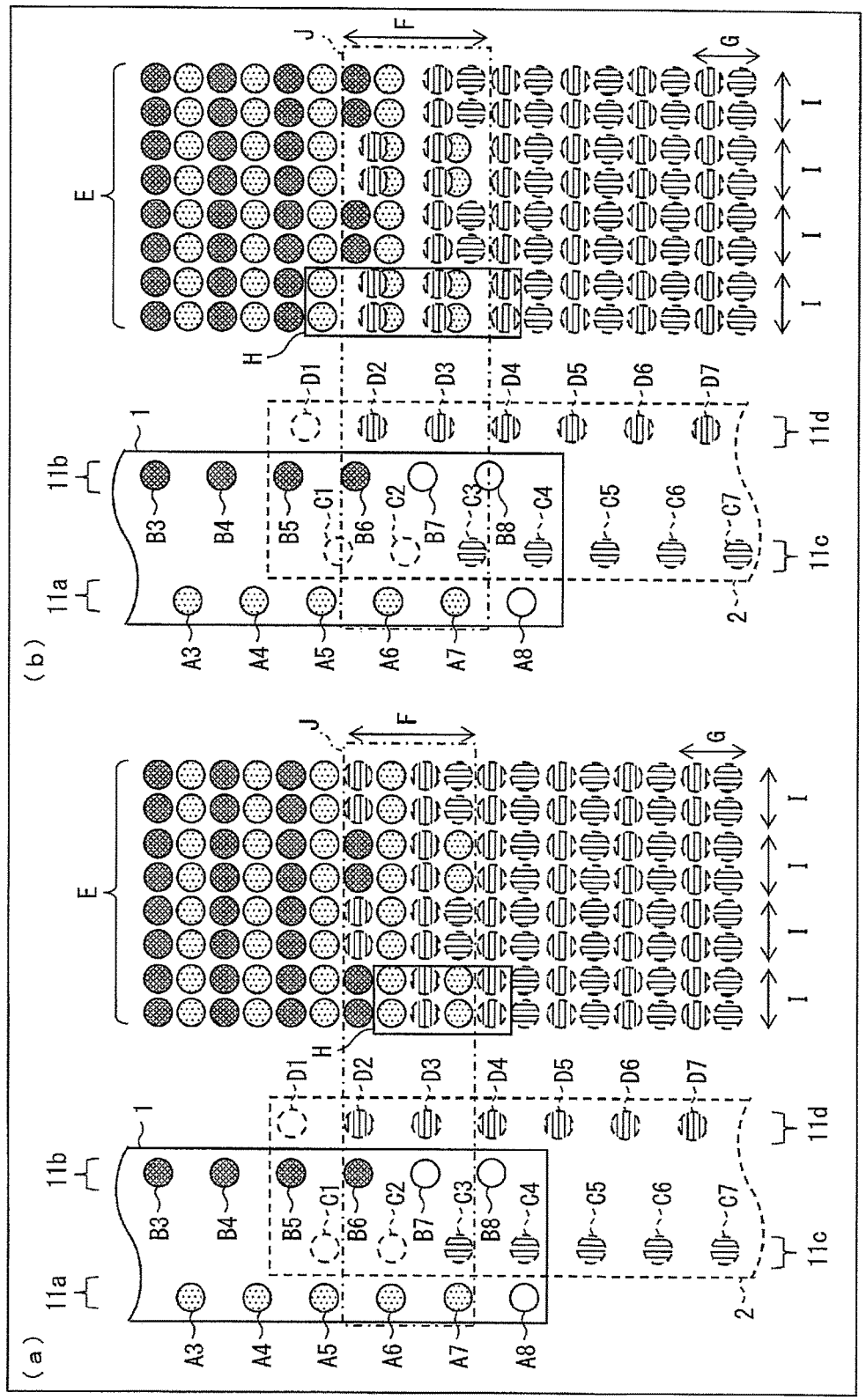
FIG. 7 is a view for explaining an operation example (a fifth operation example) of the inkjet recording device according to the embodiment of the present invention.
Figure 8:
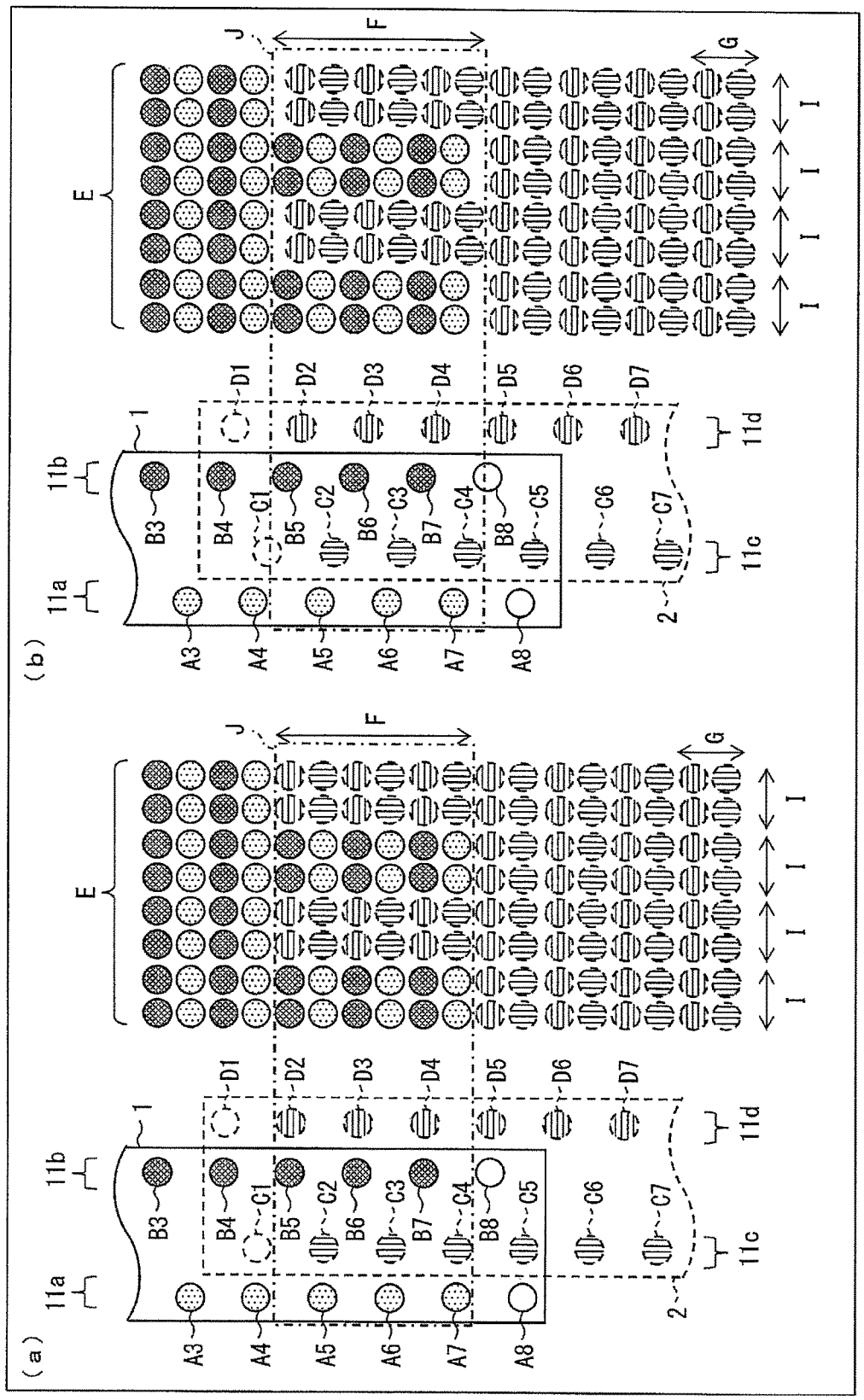
FIG. 8 is a view for explaining an operation example (a sixth operation example) of the inkjet recording device according to the embodiment of the present invention.
Figure 9:
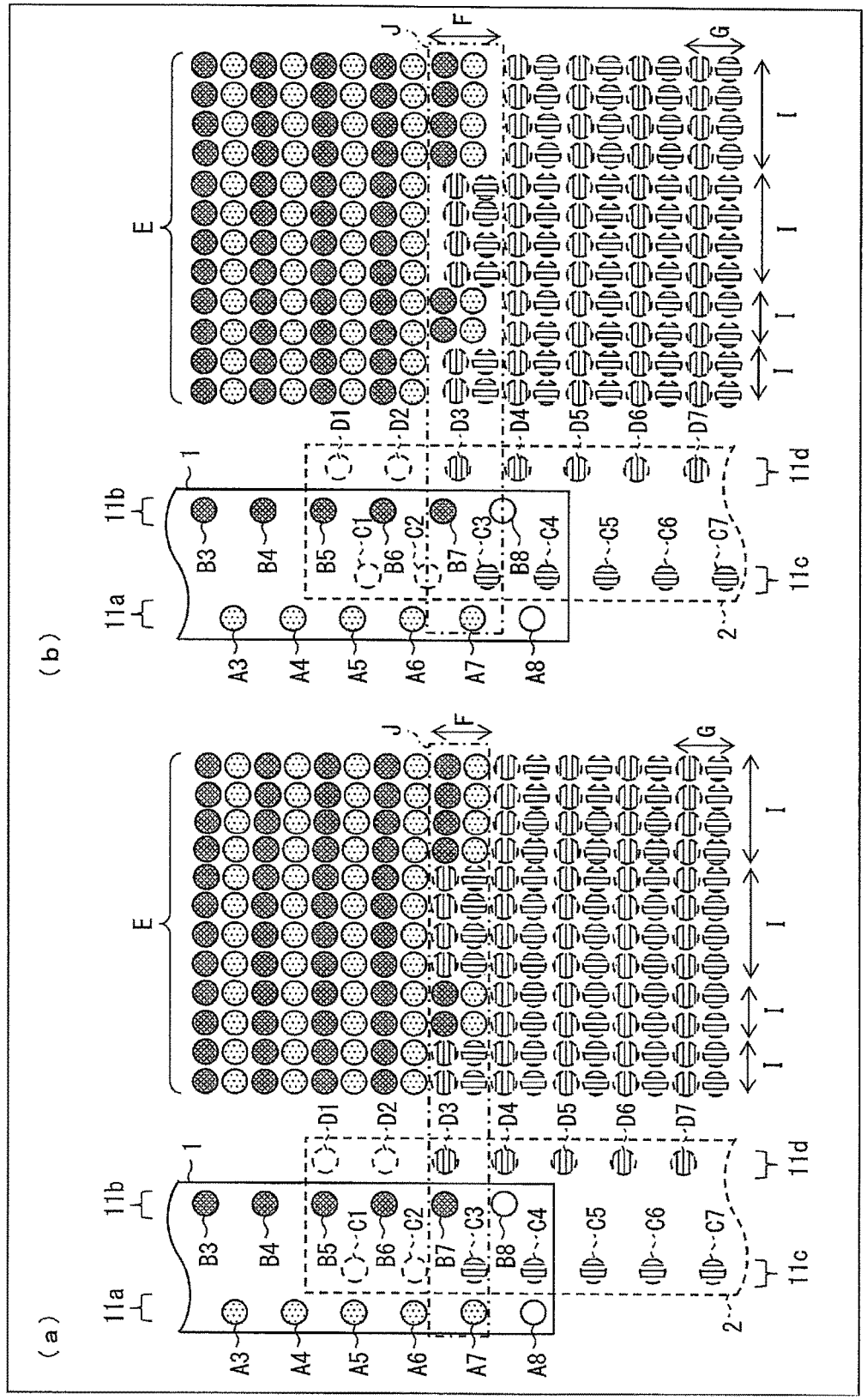
FIG. 9 is a view for explaining an operation example (a seventh operation example) of the inkjet recording device according to the embodiment of the present invention.
Figure 10:
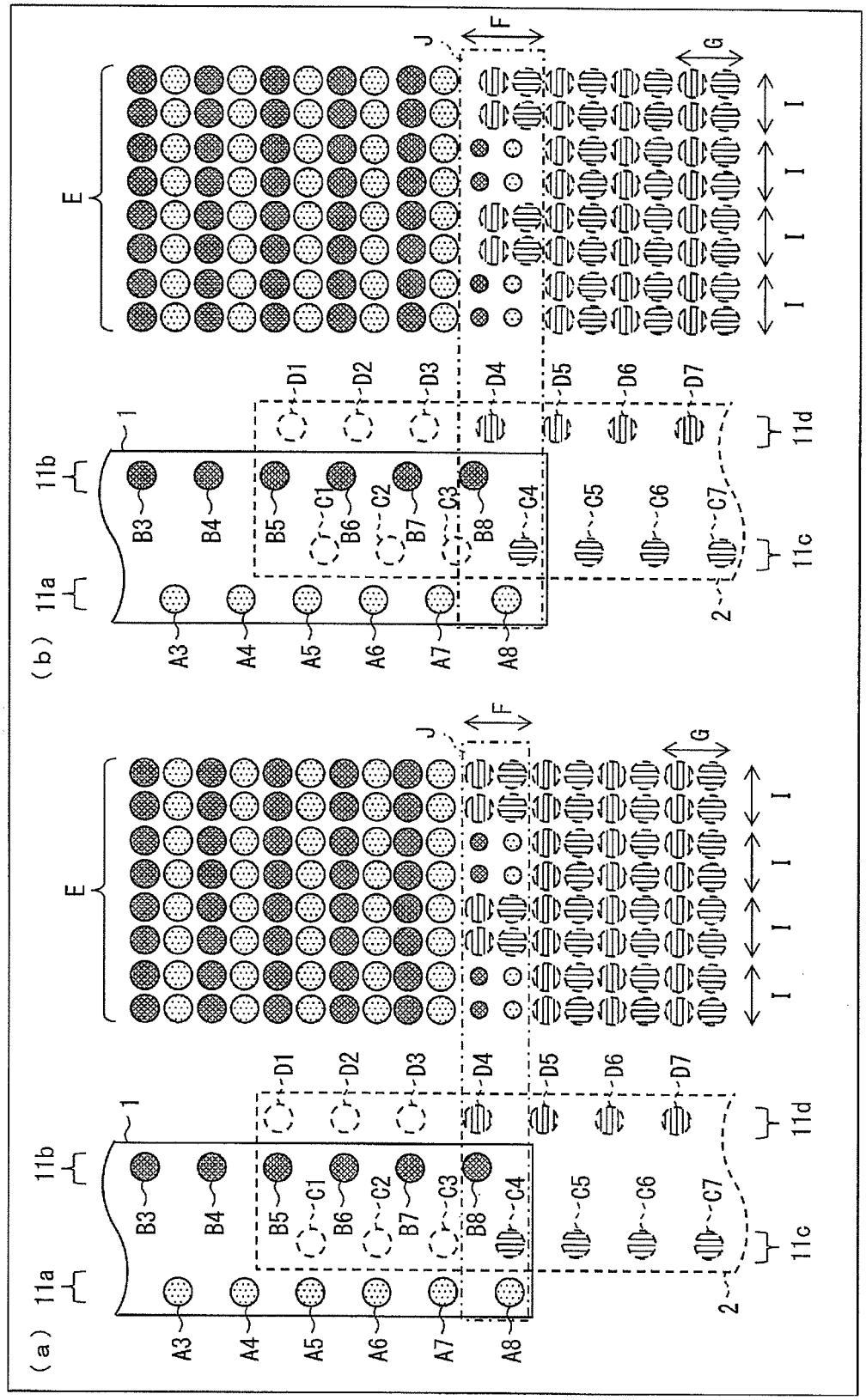
FIG. 10 is a view for explaining an operation example (an eighth operation example) of the inkjet recording device according to the embodiment of the present invention.

For example, the first operation example and the second operation example are different in that, in the first operation example, all of the areas which are recorded by the overlapping nozzles of the head 1 and the areas which are recorded by the overlapping nozzles of the head 2 continue in the sub scan direction, but in the second operation example, the areas which are recorded by the overlapping nozzles of the head 1 and the areas which are recorded by the overlapping nozzles of the head 2 do not continue in the sub scan direction (see H in FIG. 4). Although the first operation example and the second operation example are the same in the other conditions, according to the first operation example, it is possible to further suppress banding as compared to the second operation example.

Also, in the first, second, fifth, sixth, and eighth operation examples, the ejection control unit 6 performs control such that widths by which the individual nozzles belonging to the set of at least one pair of nozzles perform consecutive recording are the same as one another. Specifically, in the first operation example shown in FIG. 3, the second operation example shown in FIG. 4, the fifth operation example shown in FIG. 7, the sixth operation example shown in FIG. 8, and the eighth operation example shown in FIG. 10, all of widths I by which the individual nozzles belonging to the set of at least one pair of nozzles perform consecutive recording are 2. However, the widths I are not particularly limited as long as they are a width corresponding to two or more dots. In a case where the widths I are excessively wide, like in the seventh operation example, banding which appears in a straight line shape in the main scan direction occurs. For this reason, in order to suppress visible banding, the widths I are preferably 0.5 mm or less, and more preferably, 0.3 mm or less.

As described above, if the widths I of dot sets which are consecutively recorded in the main scan direction from the individual nozzles belonging to the set of at least one pair of nozzles are set so as to be the same, consecutive dots which are ejected from the same head have the same period. Therefore, it is possible to suppress variation between consecutive dots, and it is possible to further suppress banding. In other words, in a case where the number of times ejection is consecutively performed in the main scan direction changes (for example, between two and five), ejected ink amounts and landing positions may change. Therefore, if consecutive ejection amounts are set so as to be the same, it is possible to reduce errors other than characteristic errors attributable to the difference between the heads.

(Program and Recording Medium)

Finally, the individual blocks of the main control unit 5 may be implemented in a hardware wise by logic circuits formed on an integrated circuit (an IC chip), and may be implemented in a software wise by a CPU (Central Processing Unit).

In the latter case, the main control unit 5 includes a CPU for executing commands of a program for implementing individual functions, a ROM (Read Only Memory) retaining the above-described program, a RAM (Random Access Memory) for developing the above-described program, a storage device (a storage medium) such as a memory for storing the above-described program and a variety of data, and so on. Then, the object of the present invention can be achieved by supplying a storage medium readable by a computer and retaining the program code of a control program (executable form program, intermediate code program, source program) of the main control unit 5 which is software for implementing the above-described functions, to the main control unit 5, and reading and executing the program code recorded on the storage medium by the computer (or a CPU or a MPU).

As the above-described storage medium, for example, tapes such as magnetic tapes and cassette tapes, disks including magnetic disks such as floppy (a registered trademark) disks and hard disks and optical disks such as CD-ROM, MO, MD, DVD, and CD-R, cards such as IC cards (including memory cards) and optical cards, semiconductor memories such as Mask ROM, EPROM, EEPROM (a registered trademark), and Flash ROM, and logic circuits such as PLD (programmable logic device) and FPGA (Field Programmable Gate Array) can be used.

Also, the main control unit 5 may be configured so as to be capable of connection with a communication network, and receive the above-described program through the communication network. This communication network is not particularly limited as long as it can transmit the program code. For example, Internet, intranets, extranets, LAN, ISDN, VAN, CATV networks, VPN (Virtual Private Network), telephone networks, mobile communication networks, and satellite communication networks can be used. Also, transmission media constituting the communication network need only to be media capable of transmitting the program code, and are not limited to media having specific configurations or specific types of media. For example, it is possible to use any of wired media such as IEEE 1394 media, USB media, power line carriers, cable TV lines, telephone lines, and ADSL (asymmetric digital subscriber line), and wireless media such as infrared media like IrDA and remote control, Bluetooth (a registered trademark), wireless media based on IEEE 802.11, HDR (High Data Rate) media, NFC (Near Field Communication) media, DLNA (Digital Living Network Alliance) (a registered trademark) media, mobile telephone networks, satellite lines, and terrestrial digital networks.

The present invention is not limited to the above described embodiments, and can be variously modified within the scope defined by claims, and embodiments which can be obtained by appropriately combining the individual technical elements disclosed in the different embodiments are also included in the technical scope of the present invention.

<Supplementary Information>

As described above, in an embodiment, the inkjet recording device 10 includes the heads 1 and 2, and the ejection control unit 6 for controlling ink ejection of the heads 1 and 2, and in the individual heads 1 and 2, the plurality of nozzle rows 11a, 11b, 11c, and 11d consisting of the nozzles A1 to A8, B1 to B8, C1 to C8, and D1 to D8 arranged in the sub scan direction are apposed in the main scan direction intersecting with the sub scan direction, and in the heads 1 and 2, the positions in the sub scan direction of some nozzles of one head overlap those of some nozzles of the other head (for example, in the example shown in FIG. 3, the nozzles A5 to A8 and B5 to B8, and the nozzles C1 to C4 and D1 to D4) are disposed so as to overlap each nozzle, and the ejection control unit 6 controls the heads 1 and 2 such that (i) with respect to the overlapping nozzles, ink is ejected from the nozzles of any one head, and (ii) with respect to the set (for example, in the example shown in FIG. 3, the nozzles A7, B7, C3, and D3) of at least one pair of nozzles consisting of the nozzles of the heads included in the overlapping nozzles and arranged at the same positions or at close positions in the sub scan direction, switching to a head to eject ink according to positions in the main scan direction on an ink ejection object is performed, and (iii) at least one head of the heads 1 and 2 does not perform ejection from the nozzles A8, B8, C1, and D1 included in the overlapping nozzles and disposed at the ends of the nozzle rows 11a to 11d (a case where only the nozzles A8 and B8 of the head 1 are controlled so as not to perform ejection is included).

According to the above-described configuration, with respect to the overlapping nozzles, ink is ejected from the nozzles of any one head, and with respect to the set of at least one pair of nozzles consisting of nozzles of the heads included in the overlapping nozzles and disposed at the same or close position in the sub scan direction, switching to a head to eject ink according to positions in the main scan direction on an ink ejection object is performed. Therefore, it is possible to blur the boundary of areas which are recorded by the heads 1 and 2, respectively, and suppress banding. However, since the amount of droplets which are ejected from the nozzles A8, B8, C1, and D1 disposed at the ends of the nozzle rows 11a to 11d is small, if the vicinity of the boundary of areas which are recorded respectively by the heads 1 and 2 is printed by the nozzles A8, B8, C1, and D1 disposed at the ends of the nozzle rows 11a to 11d, small dots are recorded in the vicinity of the boundary, and it is feared that banding may occur. In contrast with this, according to the above-described configuration, since at least one head performs recording on the vicinity of the boundary without using the nozzles A8, B8, C1, and D1 disposed at the ends of the nozzle rows 11a to 11d, it is possible to suppress occurrence of banding.

Also, according to the above-described configuration, in the heads 1 and 2 having the overlapping nozzles, combinations of nozzles included in the overlapping nozzles, disposed at the same positions or close positions in the sub scan direction, and belonging to the set of at least one pair of nozzles (for example, in the example shown in FIG. 3, a combination of the nozzles A7 and C7 and a combination of the nozzles B7 and D3) are used to blur the vicinity of the boundary of areas which are recorded by the heads 1 and 2, respectively. Therefore, even in a case where calibration on the heads 1 and 2 is insufficient, it is possible to suppress banding from becoming remarkable.

Figure 3:
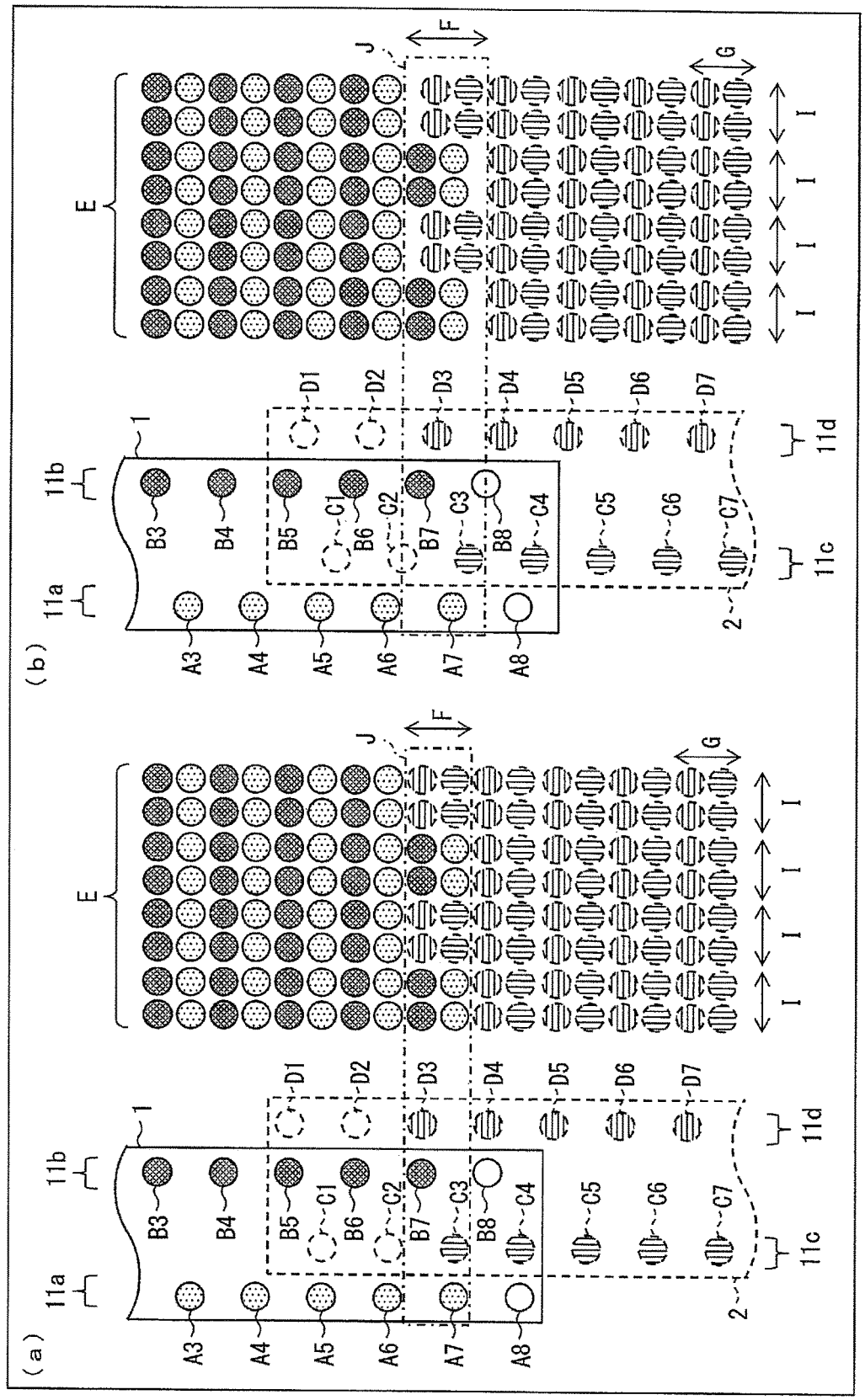
FIG. 3 is a view for explaining an operation example (a first operation example) of the inkjet recording device according to the embodiment of the present invention.

In the inkjet recording device 10, in an embodiment, the heads 1 and 2 have the plurality of nozzle rows 11a to 11d for ejecting ink of the same colors, and in the nozzle rows 11a to 11d for ejecting ink of the same colors, the positions in the sub scan direction of the nozzles included in one nozzle row and belonging to the set of at least one pair of nozzles (for example, in the example shown in FIG. 3, the nozzles A7 and B7) may be the same as or closest to those of the nozzles included in the other nozzle row and belonging to the set of at least one pair of nozzles (for example, in the example shown in FIG. 3, the nozzles C3 and D3).

According to the above-described configuration, in the heads 1 and 2 having the overlapping nozzles, combinations of the nozzles included in the overlapping nozzles, disposed at the same positions or close positions in the sub scan direction, and belonging to the set of at least one pair of nozzles are used to blur the vicinity of the boundary of areas which are recorded by the heads 1 and 2, respectively, and in the set of at least one pair of nozzles included in the nozzle rows 11a to 11d for ejecting ink of the same colors, the positions in the sub scan direction of the nozzles of one nozzle row are the same as or close to those of the other nozzle row. Therefore, even in a case where calibration on the heads 1 and 2 is insufficient, it is possible to suitably suppress banding from becoming remarkable.

In the inkjet recording device 10, in an embodiment, the ejection control unit 6 may control the heads 1 and 2 such that all of areas which are recorded by the overlapping nozzles (for example, in the example shown in FIG. 3, the nozzles A5 to A8 and B5 to B8) of one head of the heads 1 and 2 and areas which are recorded by the overlapping nozzles (for example, in the example shown in FIG. 3, the nozzles C1 to C4 and D1 to D4) of the other head continue in the sub scan direction.

According to the above-described configuration, in the heads 1 and 2 having the overlapping nozzles, areas which are recorded respectively by both heads continue. Therefore, it is possible to prevent any of consecutive dots in the sub scan direction from being recorded by both heads. Therefore, even in a case where calibration on the heads 1 and 2 is insufficient, it is possible to suitably suppress banding from becoming remarkable.

In the inkjet recording device 10, in an embodiment, the ejection control unit 6 may be configured to control the heads 1 and 2 such that the width F in the sub scan direction of the area J which is recorded by the nozzles belonging to the set of at least one pair of nozzles becomes equal to or less than twice the unit width G in the sub scan direction, and the unit width G in the sub scan direction may be a width in the sub scan direction of an area which is recorded by as many nozzles neighboring each other in the sub scan direction and included in one head of the heads 1 and 2 as the number of nozzle rows (either 11*a* and 11*b*, or 11*c* and 11*d*) for ejecting ink of the same color.

According to the above-described configuration, in the heads 1 and 2 having the overlapping nozzles, combinations of the nozzles included in the overlapping nozzles and belonging to the set of at least one pair of nozzles are used to blur the vicinity of the boundary of areas which are recorded by the heads 1 and 2, respectively, and the width F in the sub scan direction of a range which is recorded by the set of at least one pair of nozzles is reduced. Therefore, even in a case where calibration on the heads 1 and 2 is insufficient, it is possible to suitably suppress banding from becoming remarkable.

In the inkjet recording device 10, in an embodiment, the ejection control unit 6 may control the heads 1 and 2 such that the widths I by which the individual nozzles belonging to the set of at least one pair of nozzles performs consecutive recording in the main scan direction are the same.

According to the above-described configuration, in the vicinity of the boundary of areas which are recorded by the heads 1 and 2, respectively, since the widths I by which the individual nozzles perform consecutive recording in the main scan direction are the same, it is possible to suppress variation between recording areas of the nozzles, and suitably suppress banding from becoming remarkable.

In the inkjet recording device 10, in an embodiment, the ejection control unit 6 may control the heads 1 and 2 such that both heads do not perform ejection from the nozzles included in the overlapping nozzles and disposed at the ends of the nozzle rows 11*a* to 11*d*.

According to the above-described configuration, in the heads 1 and 2 having the overlapping nozzles, both heads record the vicinity of the boundary without using the nozzles A8, B8, C1, and D1 disposed at the ends of the nozzle rows 11*a* to 11*d*. Therefore, it is possible to suitably suppress occurrence of banding.

In an embodiment, an inkjet recording method is an inkjet recording method using the heads 1 and 2 wherein, in the individual heads 1 and 2, the plurality of nozzle rows 11*a* to 11*d* consisting of the plurality of nozzles A1 to A8, B1 to B8, C1 to C8, and D1 to D8 arranged in the sub scan direction are apposed in the main scan direction intersecting with the sub scan direction, and in the heads 1 and 2, some nozzles are disposed so as to overlap each nozzle in the sub scan direction, and which includes a head control process of controlling the heads 1 and 2 such that (i) with respect to the overlapping nozzles, ink is ejected from the nozzles of any one head, and (ii) with respect to the set of at least one pair of nozzles consisting of the nozzles of the heads included in the overlapping nozzles and arranged at the same positions or at close positions in the sub scan direction, switching to a head to eject ink according to positions in the main scan direction on an ink ejection object is performed, and (iii) at least one head of the heads 1 and 2 does not perform ejection from the nozzles A8, B8, C1, and D1 included in the overlapping nozzles and disposed at the ends of the nozzle rows 11*a* to 11*d*.

According to the above-described configuration, the same effects as those of the inkjet recording device 10 are achieved.

Also, a program which is a program for operating the inkjet recording device 10 and makes a computer implement the functions of the inkjet recording device 10, and a computer-readable storage medium retaining the corresponding program are also included in the scope of the present invention.

INDUSTRIAL APPLICABILITY

The present invention can be used in the manufacturing fields of inkjet recording apparatuses and the manufacturing field of recorded objects in which inkjet recording technologies are used.

The invention claimed is:

1. An inkjet recording device, comprising:
    a plurality of heads; and
    a controller, configured to control ink ejection of the plurality of heads,
    wherein, in each of the plurality of heads, a plurality of nozzle rows each consisting of a plurality of nozzles arranged in a first direction is apposed in a second direction intersecting with the first direction,
    in at least one set of two heads of the plurality of heads, positions of a portion of nozzles of one head in the first direction overlap positions of a portion of nozzles of the other head, and
    the controller controls the two heads such that
        (i) with respect to overlapping nozzles, ink is ejected from the nozzles of any one head, and
        (ii) with respect to a set of at least one pair of nozzles consisting of nozzles of the heads included in the overlapping nozzles and disposed at same position or at close positions in the first direction, switching to a head to eject ink according to positions in the second direction on an ink ejection object is performed, and
        (iii) at least one head of the two heads does not perform ejection from nozzles included in the overlapping nozzles and disposed at ends of the nozzle rows.

2. The inkjet recording device according to claim 1, wherein
    the two heads have a plurality of nozzle rows for ejecting ink of same color, and
    in the nozzle rows for ejecting ink of same color, positions in the first direction of nozzles included in one nozzle row and belonging to the set of at least one pair of nozzles are the same as or closest to positions of nozzles included in the other nozzle row and belonging to the set of at least one pair of nozzles.

3. The inkjet recording device according to claim 1, wherein
    the controller controls the two heads such that, all of areas which are recorded by the overlapping nozzles of one head of the two heads and areas which are recorded by the overlapping nozzles of the other head continue in the first direction.

4. The inkjet recording device according to claim 1, wherein
    the controller is configured to control the two heads such that, a width in the first direction of an area which is recorded by the nozzles belonging to the set of at least one pair of nozzles becomes equal to or less than twice a unit width in the first direction, and
    the unit width in the first direction is a width in the first direction of an area which is recorded by as many nozzles neighboring each nozzle in the first direction and included in one head of the two heads as the number of the nozzle rows for ejecting ink of same color.

5. The inkjet recording device according to claim 1, wherein
    the controller controls the two heads such that, widths by which each of the nozzles belonging to the set of at least one pair of nozzles perform consecutive recording in the second direction are the same.

6. The inkjet recording device according to claim 1, wherein
the controller controls the two heads such that, both heads do not perform ejection from nozzles included in the overlapping nozzles and disposed at ends of the nozzle rows.

7. An inkjet recording method using a plurality of heads, wherein
in each of the plurality of heads, a plurality of nozzle rows each consisting of a plurality of nozzles arranged in a first direction is apposed in a second direction intersecting with the first direction,
in at least one set of two heads of the plurality of heads, positions of a portion of nozzles of one head in the first direction overlap positions of a portion of nozzles of the other head, and
the inkjet recording method includes a head control process of controlling the two heads such that
(i) with respect to overlapping nozzles, ink is ejected from the nozzles of any one head, and
(ii) with respect to a set of at least one pair consisting of nozzles of the heads included in the overlapping nozzles and disposed at same position or at close positions in the first direction, switching to a head to eject ink according to positions in the second direction on an ink ejection object is performed, and
(iii) at least one head of the two heads does not perform ejection from nozzles included in the overlapping nozzles and disposed at ends of the nozzle rows.

* * * * *